United States Patent
Skuin

(10) Patent No.: US 11,475,249 B2
(45) Date of Patent: Oct. 18, 2022

(54) EXTENDING KNOWLEDGE DATA IN MACHINE VISION

(71) Applicant: Electronic Arts Inc., Redwood City, CA (US)

(72) Inventor: Boris Skuin, Vancouver (CA)

(73) Assignee: Electronic Arts Inc., Redwood City, CA (US)

(*) Notice: Subject to any disclaimer, the term of this patent is extended or adjusted under 35 U.S.C. 154(b) by 345 days.

(21) Appl. No.: 16/863,517

(22) Filed: Apr. 30, 2020

(65) Prior Publication Data

US 2021/0342644 A1    Nov. 4, 2021

(51) Int. Cl.
| | |
|---|---|
| *G06K 9/00* | (2022.01) |
| *G06K 9/62* | (2022.01) |
| *G06N 5/04* | (2006.01) |
| *G06N 20/00* | (2019.01) |
| *G06V 10/22* | (2022.01) |
| *G06V 20/40* | (2022.01) |
| *G06V 40/10* | (2022.01) |
| *G06T 7/292* | (2017.01) |
| *G06F 3/01* | (2006.01) |

(52) U.S. Cl.
CPC ........... *G06K 9/6259* (2013.01); *G06F 3/013* (2013.01); *G06K 9/6262* (2013.01); *G06N 5/04* (2013.01); *G06N 20/00* (2019.01); *G06T 7/292* (2017.01); *G06V 10/22* (2022.01); *G06V 20/42* (2022.01); *G06V 40/10* (2022.01)

(58) Field of Classification Search
CPC ...... G06K 9/6259; G06K 9/6262; G06N 5/04; G06N 20/00; G06V 10/22; G06V 20/42; G06V 40/10; G06F 3/048; G06F 3/013; G06F 3/011; G06F 16/55; G06T 7/292; G06T 7/73; G06T 7/521; G06T 7/70; G06T 7/74; H04N 21/252
See application file for complete search history.

(56) References Cited

U.S. PATENT DOCUMENTS

| | | | |
|---|---|---|---|
| 10,713,543 B1* | 7/2020 | Skuin | ................... G06N 3/0454 |
| 2017/0083792 A1* | 3/2017 | Rodriguez-Serrano | ..................... G06T 7/74 |

(Continued)

*Primary Examiner* — Steven P Sax
(74) *Attorney, Agent, or Firm* — Lee & Hayes, P.C.

(57) ABSTRACT

A machine-vision system obtains a trained-synthetic dataset associated with a virtual-sporting event, features of the trained-synthetic dataset including features associated with the virtual sporting event. The machine-vision system can further train by extending the trained-synthetic dataset using a real-life dataset associated with an actual sporting event including recognized results, the extending can include identifying and selecting a portion of the recognized results from the real-life dataset for annotation, an unsupervised machine-learning component annotating the portion, adding the annotated portion to the trained-synthetic dataset to obtain an extended-trained dataset, based on improvement of detection of the features from the extended-trained dataset compared to the trained-synthetic dataset, and availability of another portion of the recognized results, repeating the extending using a part of the extended-trained dataset as the trained-synthetic dataset in a next iteration, and providing the extended-trained dataset to the machine-vision system.

12 Claims, 10 Drawing Sheets

(56) References Cited

U.S. PATENT DOCUMENTS

| | | | |
|---|---|---|---|
| 2019/0082233 A1* | 3/2019 | Love | H04N 21/252 |
| 2019/0156485 A1* | 5/2019 | Pfeiffer | G06V 20/56 |
| 2019/0221001 A1* | 7/2019 | Dassa | H04N 21/4316 |
| 2020/0023262 A1* | 1/2020 | Young | G06T 7/73 |
| 2020/0050965 A1* | 2/2020 | Harvill | G06N 5/04 |
| 2020/0074181 A1* | 3/2020 | Chang | G06F 3/011 |
| 2020/0105009 A1* | 4/2020 | Eno | G06T 7/70 |
| 2020/0174132 A1* | 6/2020 | Nezhadarya | G06T 7/521 |
| 2020/0193163 A1* | 6/2020 | Chang | G06F 3/013 |
| 2021/0117728 A1* | 4/2021 | Lee | G06K 9/6218 |
| 2021/0125001 A1* | 4/2021 | Guo | G06F 16/55 |
| 2021/0264141 A1* | 8/2021 | Chojnacki | G06T 7/292 |

\* cited by examiner

EXTENDING KNOWLEDGE DATA IN MACHINE VISION

BACKGROUND

Application of machine learning to images is useful in a variety of situations, but typically much of the work must be supervised; obtaining a ground truth, performing training, and manually annotating images is quite time consuming. Attempts have been made to shift to more unsupervised learning models, but such models often produce unsatisfactory results in the visual realm. For example, such conventional models often produce representations that defy the laws of physics. A need for improved reliability in machine vision due to these unsatisfactory results.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
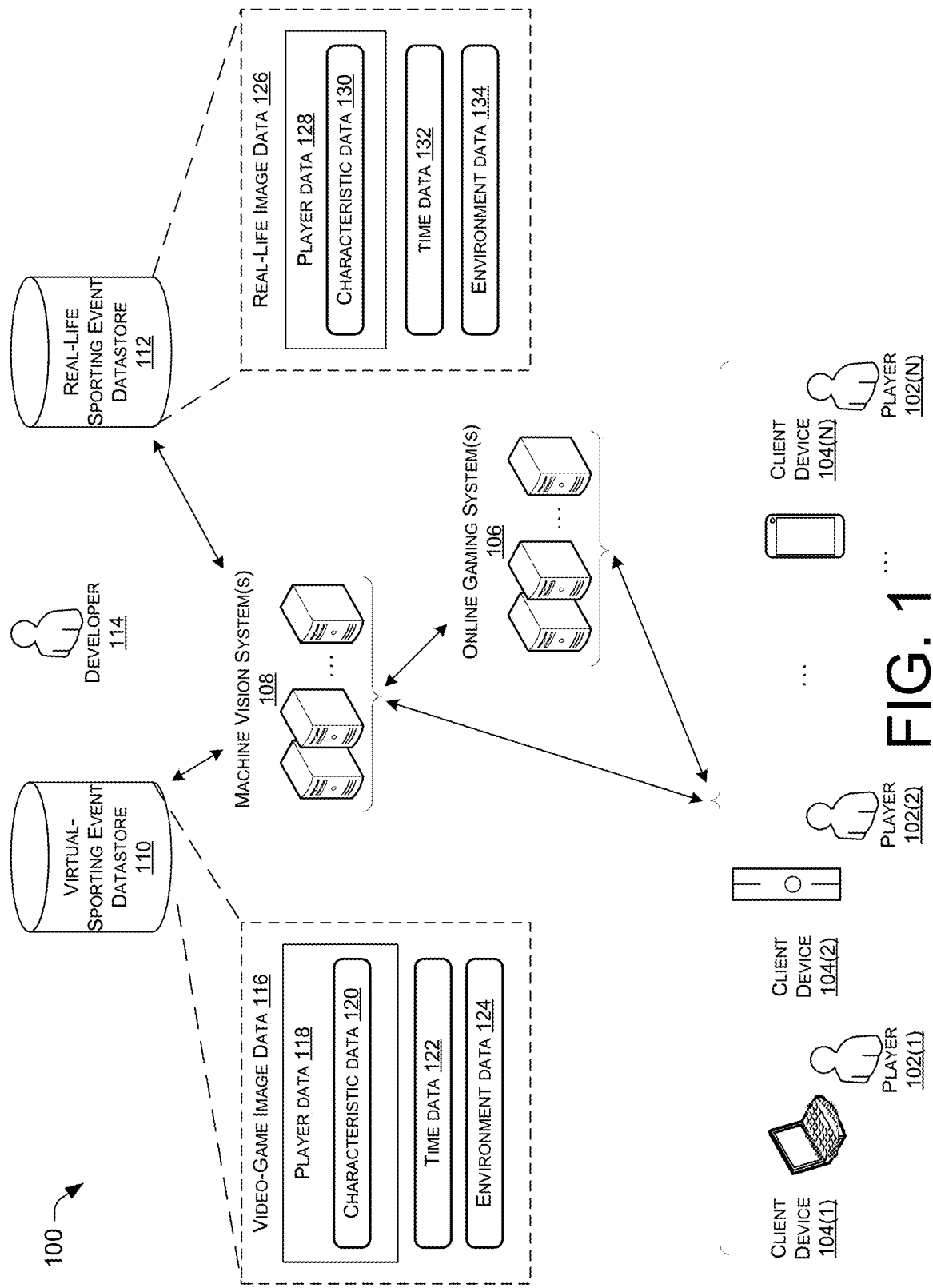
FIG. 1 illustrates an example operating ecosystem for extending knowledge data in machine vision in accordance with examples described herein.

Examples in this disclosure describe techniques, e.g., methods, apparatuses, computer-readable media, and/or systems, for extending knowledge data in machine vision, such as extending knowledge data associated with a virtual-sporting event, (e.g., a video game), with knowledge data associated with an actual-sporting event (e.g., a real-life game). For example, the machine-vision system described herein can improve reliability of unsupervised annotation of features from a virtual-sporting event. Video game designers, and others, apply machine learning to improved feature recognition in games and facilitate more realistic game play. Identifying errors in graphical representation is a time-consuming task for designers and testers, but correcting such errors is important for the game environment and immersion of game players in game scenarios. For example, it can be unsatisfactorily jarring for a player if a graphical presentation defies the laws of physics during game play. Even smaller errors, like slightly misplaced environmental elements, can disturb players and decrease their enjoyment of a video game.

In at least one example machine vision includes machine learning to obtain and analyze images, including video, to extract data from the images. Examples of a machine-vision system described herein use machine learning to identify features in the images that appear to correlate with and/or violate natural laws like physics. A machine-vision system can use machine-vision to detect and recognize objects and associated features, estimate 3D poses, reconstruct features of a scene, and estimate motion. A machine-vision system can apply and learn various models applied to image data, which can include recorded still and/or video images, multiple camera views. In some examples, image data can include multi-dimensional data and/or differential image data. Image data can include various input data augmentations, such as full red green blue (RGB), grayscale, differential images, Canny lines, Laplacian image processing, etc.

In various examples described herein, a machine-learning component can include a data structure and/or logic related to processing image data. A machine-learning component can include, for example, semantic segmentation, classification networks, Multilayer Perceptrons (MLP), deep neural networks (DNN), convolutional neural networks (CNN), Long Short-Term Memory (LSTM) and/or other types of recurrent neural networks (RNN), recurrent and convolutional neural networks (R-CNN) and/or other types of hybrid neural networks. Machine-learning components can also include light-weight models such as decision trees, random forest, Bayesian networks, or any suitable predictive models. A machine-learning component can operate on variety of features within one or more sematic segmentation neural network types. In examples with a single sematic segmentation neural network type, a machine-learning component can operate on variety of features by using different network architectures (such as Hourglass, UNet, SegNet, SpineNet, etc.) and/or by varying a number of features per neural network type. For example, each neural network can be used to detect one feature type, such as one for faceoffs, one for arena lines, one for hockey net corners, one for stadium borders, etc. or any combination of features. Since each neural network has limited internal learning capabilities and/or resources, a machine-learning component as described herein can increase precision per requested feature(s). The machine-vision system described herein can use many, e.g., dozens to hundreds, of separate simple augmented networks to leverage multi-processor architecture and parallelization of processing. In various examples, simple augmented networks can include one-feature, two-feature, three-feature, etc. networks. Unless otherwise stated, machine-learning components operate unsupervised in the examples described herein.

A scene can include a graphical representation of image data associated with one or more still images and/or video frames. In various examples, the images can include synthetic images, such as those obtained from a virtual-sporting event, e.g., video-game play, and/or real-life images, such as those obtained from an actual, real-life sporting event. Herein hockey is the type of sporting event used for illustration, but the techniques are applicable for a variety of types of sporting events including soccer, American football, basketball, baseball, etc.

In various examples herein related to features, a feature can include any detectable aspect associated with a scene including features associated with the representation of the environment and/or features associated with representation of players in the virtual-sporting event and/or actual-sporting event. Machine-learning components can tag or annotate features associated with scenes.

A representation of an environment includes non-player elements of a scene. Features associated with representation of the environment can include the stadium, the skating rink, boarders, boards, stanchions, crowd, hockey net (and/or hockey net corner(s), color encoded areas of the rink, e.g., blue lines, red-center line, face-off circles, face-off dots, etc.

A representation of a player includes player-associated objects in a scene. Features associated with representation of the player can include parts and/or characteristics of a player such as head, legs, feet, arms, hands, torso, side, front, back, size, mask, silhouette, heat map, player center, e.g., origin of the player from animation for a synthetic player, and/or center-mass as detected for a real-life player, etc.

Time can also be included as a feature. Some features can be generated from a combination of other features, for example, a bounding box can be generated from a player center and a heat map. Combinations can be useful for identifying anomalies in feature generation and/or identification, such as a combination of a player size feature combined with the time feature to identify an erroneous bounding box feature.

Conventionally neural networks are trained using a full training dataset, with all the data participating in training. In some examples described herein, features can be trained on different datasets, (e.g., a hockey net is not visible in every hockey scene, so a machine-learning component can train the net feature from a separate subsets of images. A combination of different neural network architectures, different input datasets, different input data processing, and/or different requested annotation features can provide one or more independent and/or semi-independent networks and detected features that can match and/or correlate with each other, and thereby serve as a source for the machine-vision system described herein to detect issues use them for correction as well as extending the knowledge data in the machine-vision system. The machine-vision system described herein adds new training data, some of which may be less reliable or contain errors that could confuse a conventional neural network system so training would not converge. In such a conventional neural network system, the conventional neural network could train onto the erroneous data, essentially memorizing the errors so that future predictions expect the errors without recognizing that they were anomalies. The machine-vision system described herein can mitigate those issues from conventional neural network systems while employing new training data by automatically removing less reliable data from the training process according to the following algorithm.

The machine-vision system described herein generates a new-full dataset for training, by automatically extending an existing dataset, e.g., a trained-synthetic dataset, with new data from another dataset, e.g., a real-life dataset, for the machine-vision system to improve on.

The machine-vision system trains for one or more passes (epochs) on the new-full dataset.

The machine-vision system then evaluates learning errors from the data, e.g., all of the data, in this new-full training dataset.

After the evaluation, the machine-vision system sorts the new-full training dataset based on evaluation of the errors, e.g., from large to small according to one or more of number of errors, size of errors, etc.

The machine-vision system selects the middle portion (e.g., middle 30-70%, middle 50%, etc.) of the sorted new-full training dataset, which can be considered to represent average errors, for further processing. The machine-vision system drops the portion with the large errors from further processing. The portion with the large errors contains data that are incorrect or unreliable, thus hard to learn. By dropping the portion with large errors, the machine-learning component will properly learn typical cases that can be generalized over additional data. The machine-vision system also drops the portion with the small errors from further processing because this represents data that already has been well learned. By dropping the portion with small errors, the machine-vision system can prevent the machine-learning component from over-fitting on the portion with small errors and reserve the processing time for parts still to be learned.

The machine-vision system trains for one or more epochs on the middle portion of the sorted new-full training dataset.

The machine-vision system can repeat the process from evaluation through training epochs on the middle portion until a desired average prediction error is reached, e.g., the machine-learning component is fully trained.

The machine-vision system extracts final outliers, the final portion that likely contains large errors. In various examples, the machine-vision system can report the final outliers for human intervention and remove them from the current dataset, if errors are large enough so they are not accumulated over future training passes. In some examples, the machine-vision system can start another automated error evaluation epoch, generating a new-full dataset for training, by automatically extending the existing dataset with new, previously unseen data from another dataset, for the machine-vision system to improve on and proceed through extracting final outliers from the generated new-full dataset.

The machine-vision system can repeat the training process from generating a new-full dataset for training through extracting final outliers many times for new data, (e.g., new real-life data). The machine-vision system can repeat the training process until there is a certain level of diminishing returns, e.g., there is 10-1% error. That is to say that the machine-vision system learning has ended and the machine-vision system has reached the peak of its prediction performance for the available data.

In at least one example, the machine-vision system described herein can extract camera information, e.g., camera placement, rotation, zoom, etc. from training datasets and recreate such camera information in video-game play. In some examples, the machine-vision system described herein can capture and create more stadium specific cameras and/or create new types of cameras based on video from an actual sporting event, e.g., an NHL game.

In various examples, the machine-vision system described herein can provide motion-capture (mocap) technology from real-life images and video, e.g., NHL footage. In at least one example, the machine-vision system can detect player positions and/or actions represented in real-life images and video and extract them for further use. Similarly, the machine-vision system can detect player positions and/or actions represented in virtual-sporting event images and animations and extract them for further use, sometimes with mocap quality or close to mocap quality.

The machine-vision system can improve camera tracking by learning how human camera operators perform during an actual-sporting event, e.g., an NHL game, and recreating the performance in virtual-sporting events (video game play), e.g., close shot cameras, on-goal cameras, center-ice cameras, etc. The machine-vision system can learn camera shots for game situations, so rather than video-game developers manually creating a "live broadcast" for a video game, the video game can learn from videos of actual games including different coverage styles.

In various examples, the machine-vision system can perform substantially simultaneous motion and camera capture. In some examples, this can be integrated with other logical components to integrate and recreate complex interactions from actual-sporting events into virtual-sporting events such as a Stanley cup celebration being automatically created in a video game based on video of an actual Stanley cup celebration.

In at least one example, machine-learning components of the machine-vision system can classify and annotate frames of videos, which can then be requested and/or selected for specific occurrences from live video, e.g., a check, a goal, etc. Machine-learning components of the machine-vision system can detect player positions, actions and animation captures to train on examples from NHL players and teams, including automatically capturing specific teams, player styles, moves, etc.

The machine-vision system is useful for error correction as it can automatically identify and save issues from video-game play such as issues with camera clipping, shots with wrong or unexpected framing, etc.

FIG. 1 illustrates an example operating ecosystem for extending knowledge data in machine vision in accordance with examples described herein.

The example ecosystem 100 can be used by any number of video-game players 102(1)-102(n) with their associated client devices 104(1)-104(n). In various instances client devices 104(1)-104(n) can connect to online gaming system(s) 106 that can facilitate game play among and between video-game players, receive feedback from client devices 104(1)-104(n), and provide updates to video-game software on client devices 104(1)-104(n), etc. As illustrated, online gaming system(s) 106 can be connected to a machine-vision system 108, which has one or more associated datastores, that can include a virtual-sporting event datastore 110 and an actual-sporting event datastore 112. The datastores store datasets that video-game developers 114 can access to develop and improve video games using the machine-vision system 108. In various examples, these video games and improvements can be provided to client devices 104(1)-104(n) directly from machine-vision system 108 and/or via online gaming system(s) 106.

According to some examples, virtual-sporting event datastore 110 can store a variety of types of video-game image data 116 including player-representation data 118, player characteristics data 120, time data 122, and environment data 124. Meanwhile, actual-sporting event datastore 112 can store a variety of types of real-life image data 126 including real-life player-representation data 128, real-life player characteristics data 130, real-life time data 132, and real-life environment data 134.

Video-game developers 114 can use machine-vision system 108 to automatically improve player animation and environment presentation in their video games thereby reducing the amount of time to produce a high-quality game. Machine-vision system 108 can use a plurality of machine-learning components, (e.g., 2-15, 10-12, etc. components), to process image data and can include a variety of types of machine-learning components, (e.g., 2-15, 10-12, etc. types), such as semantic segmentation, classification networks, Multilayer Perceptrons (MLP), deep neural networks (DNN), convolutional neural networks (CNN), Long Short-Term Memory (LSTM) and/or other types of recurrent neural networks (RNN), recurrent and convolutional neural networks (R-CNN) and/or other types of hybrid neural networks. A machine-learning component can operate on variety of features within one or more sematic segmentation neural network types. In examples with a single sematic segmentation neural network type, a machine-learning component can operate on variety of features by using different network architectures (such as Hourglass, UNet, SegNet, SpineNet, etc.) and/or by varying a number of features per neural network type. For example, each neural network can be used to detect one feature type, such as one for faceoffs, one for arena lines, one for hockey net corners, one for stadium borders, etc. or any combination of features. Since each neural network has limited internal learning capabilities and/or resources, a machine-learning component as described herein can increase precision per requested feature(s). The machine-vision system described herein can use many, e.g., dozens to hundreds, of separate simple augmented networks to leverage multi-processor architecture and parallelization of processing. In various examples, simple augmented networks can include one-feature, two-feature, three-feature, etc. networks. Machine-learning components can also include light-weight models such as decision trees, random forest, Bayesian networks, or any suitable predictive models.

Video-game image data 116 can include between a plurality of types of feature data, (e.g., 2-200, 100-120, etc.), and can include player representation data 118 for representation of players in a video game. Player characteristics data 120 includes features associated with representation of the player, parts and/or characteristics of a player such as head, legs, feet, arms, hands, torso, front, back, side, size, mask, silhouette, heat map, player center, e.g., origin of the player from animation for a synthetic player, and/or center-mass as detected for a real-life player, etc. Meanwhile, real-life image data 126 can include between a plurality of types of feature data, (e.g., 2-200, 100-120, etc.), and can include real-life player-representation data 128. Real-life player characteristics data 130 includes features associated with representation of the player, parts and/or characteristics of a player such as head, legs, feet, arms, hands, torso, front, back, side, size, heat map, player center, e.g., center-mass as detected for a real-life player, etc.

Video-game image data 116 also includes time and/or time span features from time data 122 and features associated with representation of the environment such as the stadium, the skating rink, boards, stanchions, crowd, color encoded areas of the rink, e.g., blue lines, red-center line, face-off circles, face-off dots, etc. from environment data 124 for representation of the environment in the video game.

Figure 2:
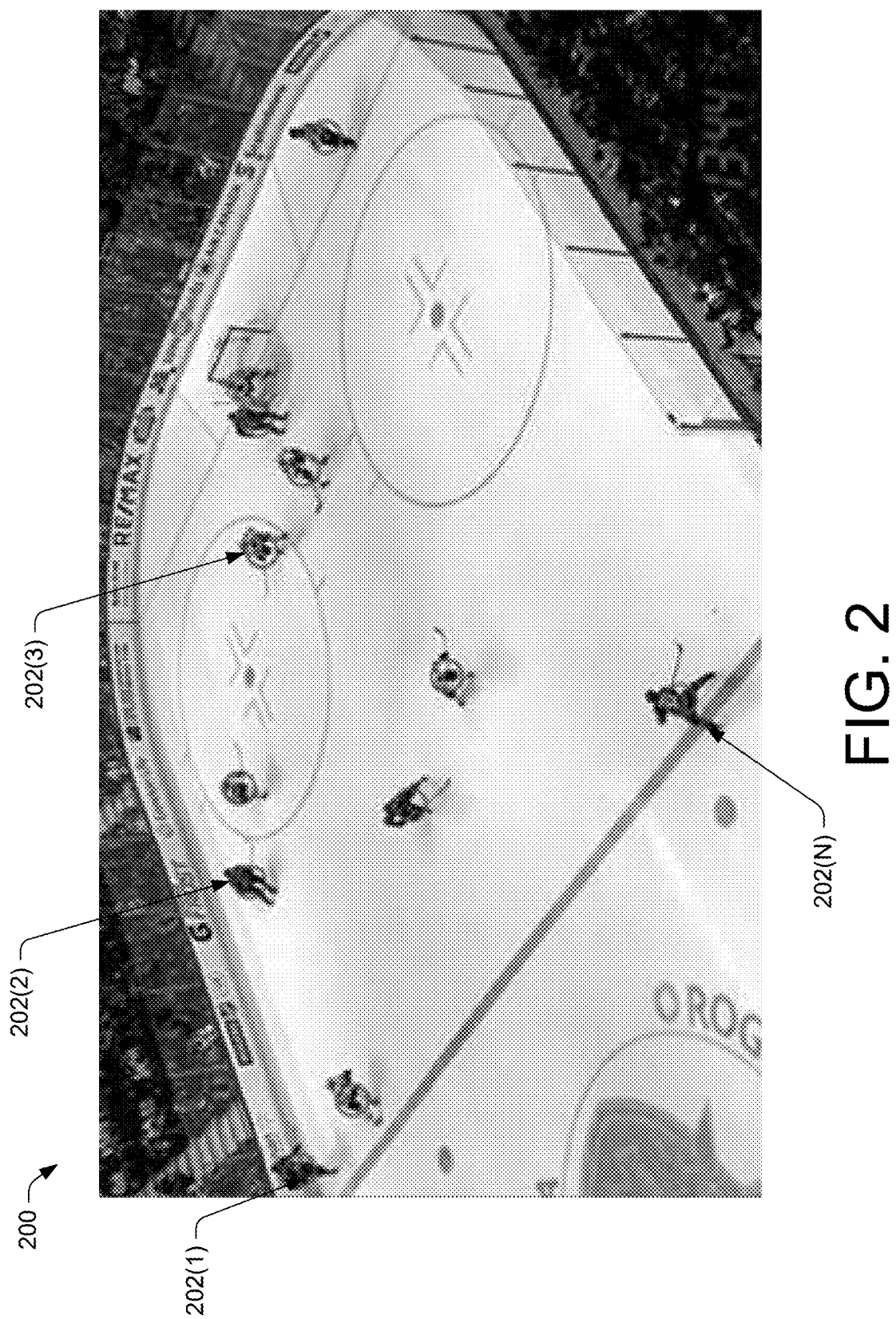
FIG. 2 illustrates a first detected feature in an example hockey scene in accordance with extending knowledge data in machine vision as described herein.

FIG. 2 illustrates an example hockey scene in accordance with extending knowledge data in machine vision as described herein. Scene 200 includes representations of a number of players on the ice with a circle indicating a detected center feature 202(1)-202(n) for the corresponding players represented in the scene. Center feature 202 is but one example characteristic from a representation of a player that machine-learning components of the machine-vision system 108 are capable of detecting from player-representation data 118, player characteristics data 120, real-life player-representation data 128, and/or real-life player characteristics data 130.

Figure 3:
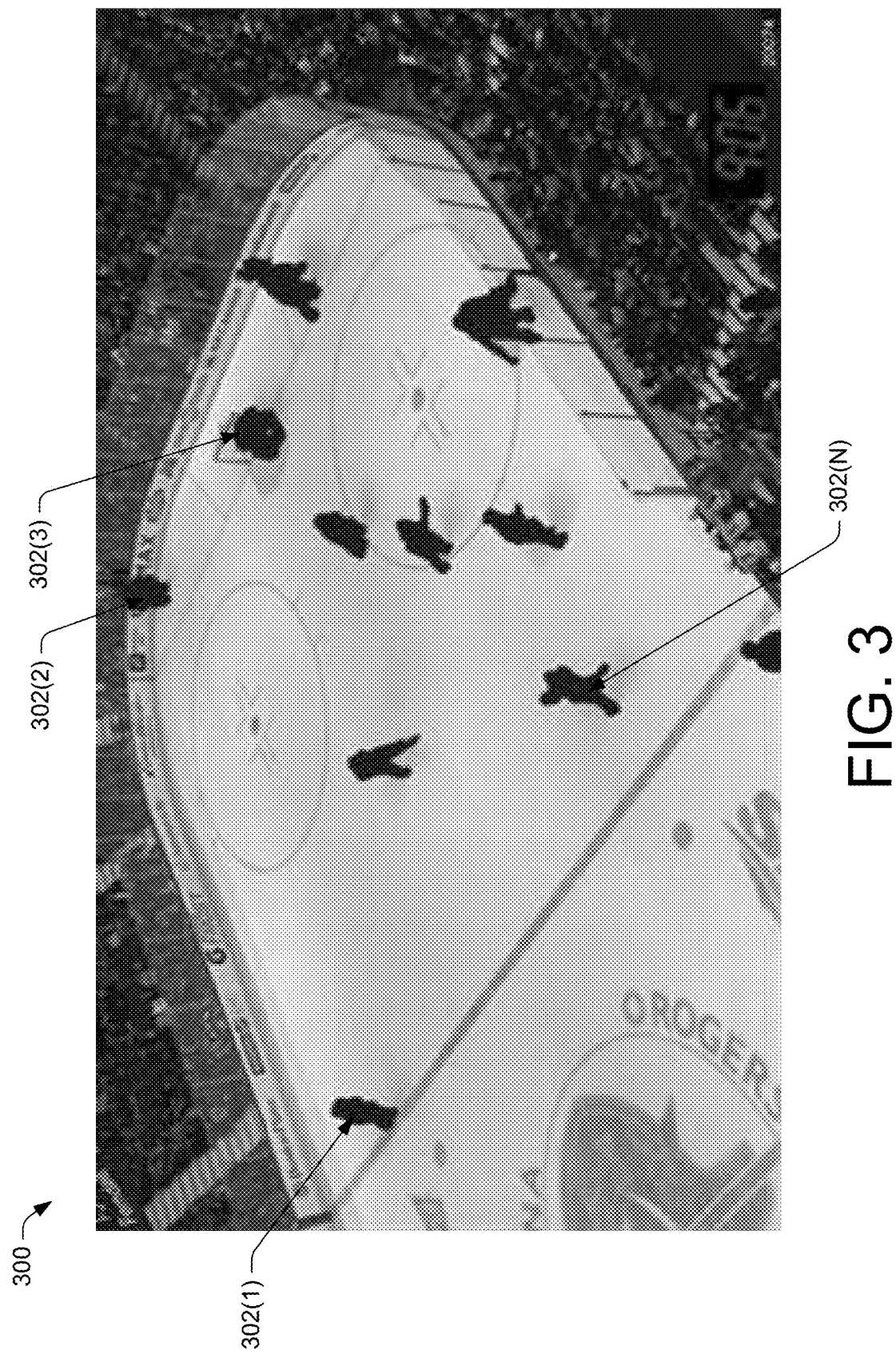
FIG. 3 illustrates a second detected feature in an example hockey scene, in accordance with extending knowledge data in machine vision as described herein.

FIG. 3 illustrates an example hockey scene in accordance with extending knowledge data in machine vision as described herein. Scene 300 includes representations of a number of players on the ice with an automatically generated mask or silhouette 302(1)-302(n) created by a machine-learning component from a synthetic-training dataset of video-game image data 116. Mask or silhouette feature 302 is another example characteristic from a representation of a player that machine-learning components of the machine-vision system 108 are capable of detecting from player characteristics data 120 of player-representation data 118. One approach to applying a machine-learning component to attempt to obtain mask or silhouette features 302 from real-life player-representation data 128 and real-life player characteristics data 130 is to analyze a heat map; however, features other than features of player representation data 128 or characteristics data 130 may be erroneously be included such as stanchions, ice markings, crowd, etc. This illustrates that some features that are efficiently detected in synthetic data may not alone be well detected in real-life data. These features can still be useful for extending knowledge data in machine vision when combined with other features.

Figure 4:
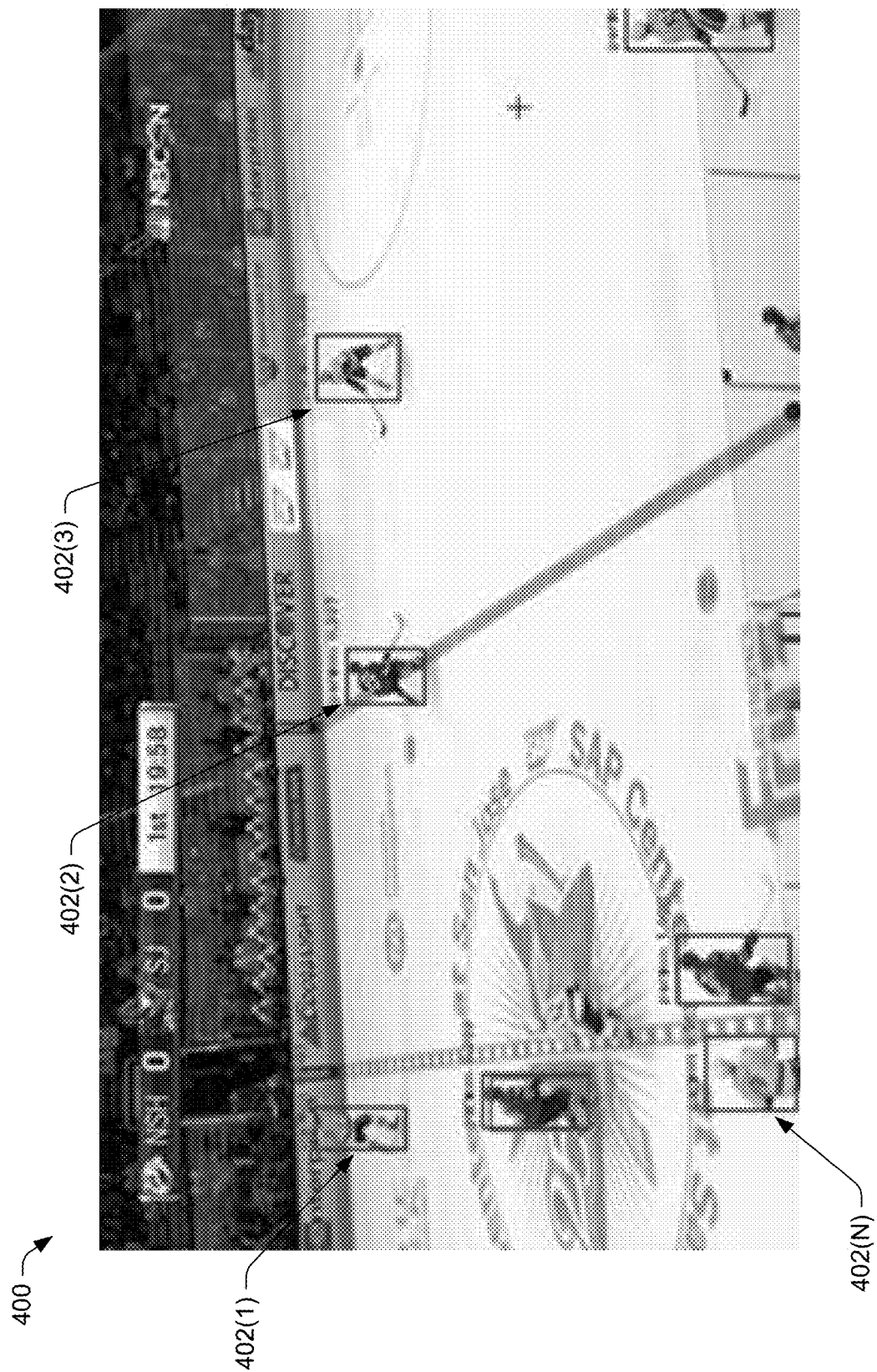
FIG. 4 illustrates a generated feature in an example hockey scene, in accordance with extending knowledge data in machine vision as described herein.

FIG. 4 illustrates an example hockey scene, in accordance with extending knowledge data in machine vision as described herein. Scene 400 includes representations of a number of real-life players on the ice with automatically generated bounding box features 402(1)-402(n). The automatically generated bounding box feature 402 can be created from a combination of a detected center feature 202 and a mask or silhouette 302 for a representation of a player.

Masks or silhouettes 302 that do not have a corresponding center feature 202 and/or a corresponding bounding box feature 402 can be marked as misdetections or errors and omitted from further processing by the machine-learning component for mask or silhouette features 302. By thus extending the dataset, the machine-learning component for mask or silhouette features 302 will learn on the detected masks or silhouettes, which will improve future prediction results for masks or silhouettes from the associated machine-learning component.

The machine-vision system 108 can use the automatically generated bounding box features 402 to train a new class of box detection machine-learning components, such as a faster recurrent convolutional neural network (FRCNN), etc.

The examples illustrated show three different features for representations of players, though many more may be used. The machine-vision system 108 can cross-reference the different features for any newly identified data. The machine-vision system 108 can evaluate any newly identified data for validity, e.g., does it correspond with data from other features associated with the same dataset, and at least a portion of the newly identified data can be added to extend the training to improve the previous dataset.

The machine-vision system 108 leverages environment features 124 and 134. In the illustrated examples of a standard NHL hockey rink, there is an extensive set of detectable features that are in high correlation with each other. Each stadium has a consistent set of features, like nets, boards, faceoff dots, ice lines, etc. that have known positions. Since locations of these environmental features are relative to each other, the machine-vision system 108 detecting a few can be leveraged to predict where others are or should be located. Machine learning components of the machine-vision system 108 can identify these relationships and predict locations of environmental features that are not visible or have been mis-detected with high confidence.

Figure 5:
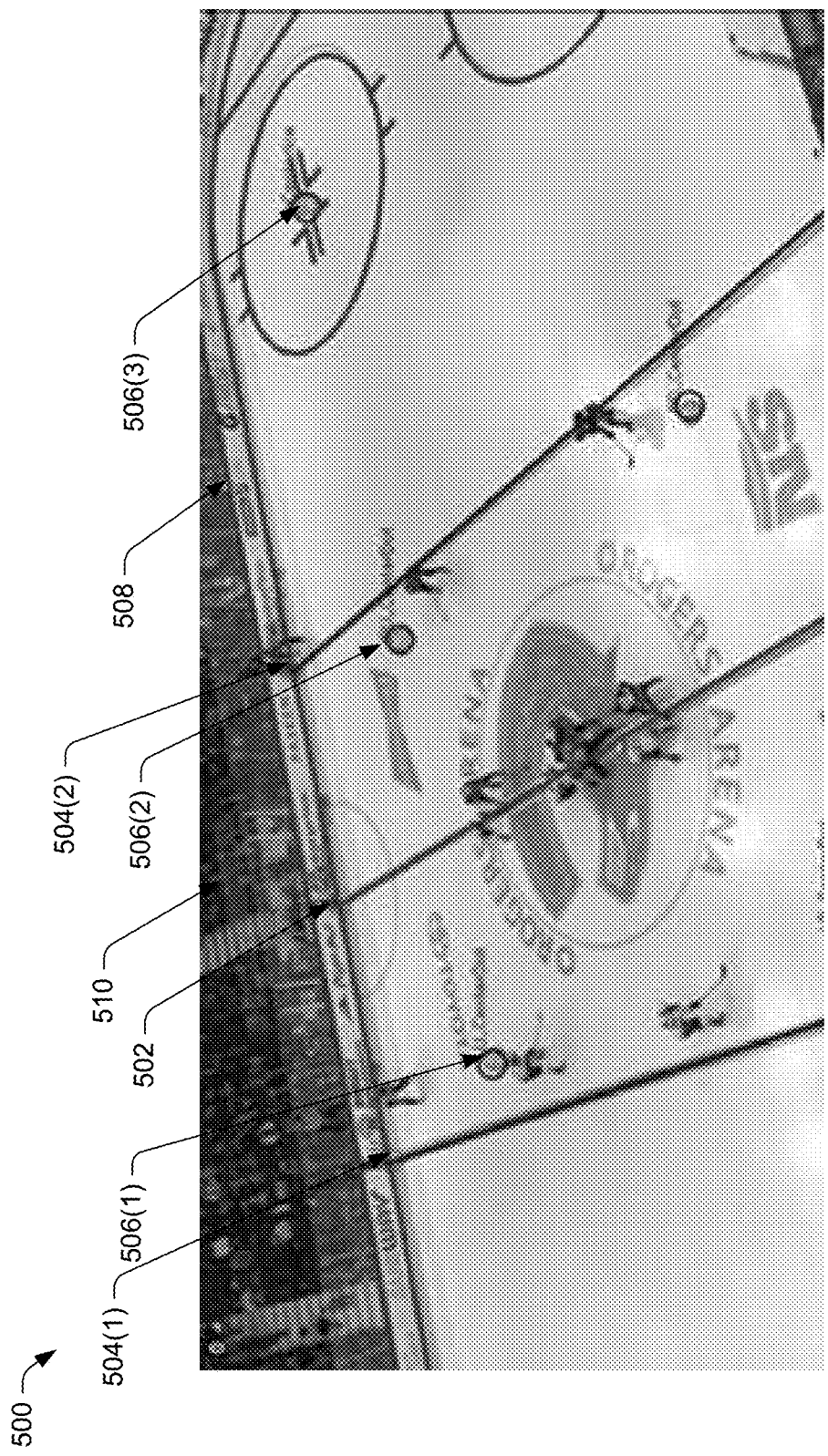
FIG. 5 illustrates detected environment features in an example hockey scene, in accordance with extending knowledge data in machine vision as described herein.

FIG. 5 illustrates an example hockey scene, in accordance with extending knowledge data in machine vision as described herein. Scene 500 includes environment features detected by a machine-learning component such as a per-pixel semantic segmentation neural networkdirect parameters CNN, instance segmentation NN (e.g., MaskRCNN), any of the bounding box NNs (fully convolutional neural network (FCNN), you only look once (YOLO), CornerNet, CenterNet, etc.). The machine-learning component detects areas of interest in the illustrated example NHL hockey rink, such as red line 502, blue lines 504(1) and 504(2), faceoff spots and circles 506(1)-506(3), boards 508, crowd 510, etc. Scene 500 shows a reasonably accurate logical mark up of hockey rink. Greater levels of granularity may be desired such as identifying particular face-off dots, e.g., center zone home side left, center zone away side right, etc. In that case the machine-learning component (or another machine-learning component) can annotate the locations of the individual face-off dots.

When the machine-vision system 108 has identified location and logical zone, the machine-vision system can run a 3D camera pose evaluation logic, to obtain 2D-3D mapping and generate a re-projection camera matrix. This camera matrix can use known, implied, or acquired stadium 3D layout features, to access multiple known stadium object locations, which enables determining camera position from any subset of points. In this respect, the standard layout of an NHL hockey rink enables the determination as measurements are known, relationships between locations are known, and the machine-vision system 108 can predict the location of any environment feature without necessarily being presented a representation of it, just by being presented neighboring environment features and knowing their spatial relationships in the environment. However, automatic camera detection may not be perfect, and the machine-vision system 108 can run additional machine-learning components to compensate as discussed regarding FIG. 6, below.

Figure 6:
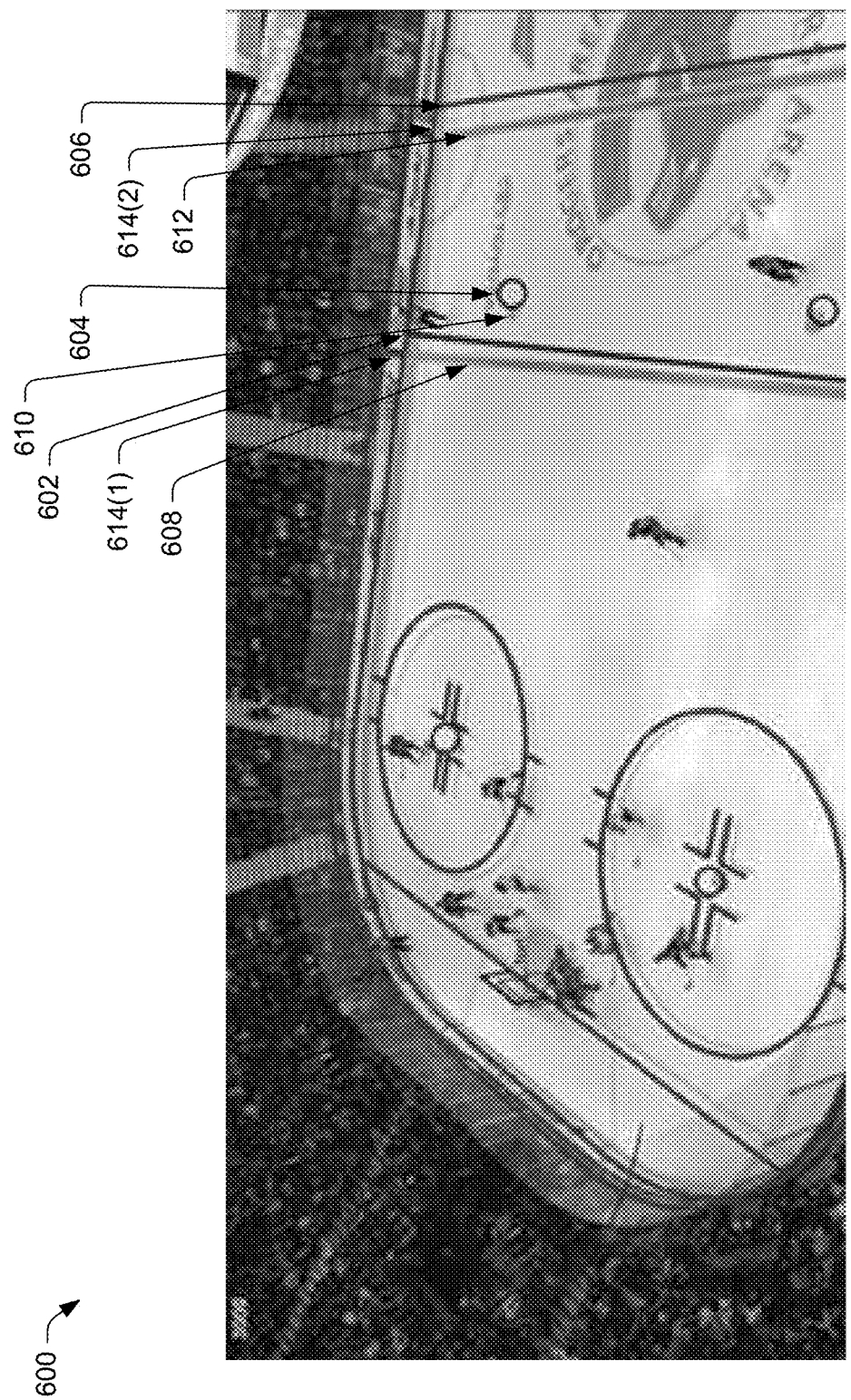
FIG. 6 illustrates generated environment features in an example hockey scene, in accordance with extending knowledge data in machine vision as described herein.

FIG. 6 illustrates generated environment features in an example hockey scene 600, in accordance with extending knowledge data in machine vision as described herein. In scene 600, low reliability of camera detection has resulted in projected geometry blue line 602, face-off dot 604, red line 606 not matching with detected features blue line 608, face-off dot 610, red line 612 of the actual stadium markings on the ice and boards 614(1), 614(2), etc.

The machine-vision system 108 can use such discrepancies as part of a tool to verify camera detection. The machine-vision system 108 can use correlation between representations of objects in the environment produced from one or more machine-learning components, to designate those identified by a majority. In addition to those illustrated, the machine-vision system 108, can detect other environmental feature identification and/or projection errors, e.g., unclear detection of face-off crosses inside face-off circles, etc.

With image camera detection and with standard stadium layout, the machine-vision system 108 can generate a number of reconstructions, such as a 3D-reconstruction of a straight-on boards view, a 3D-reconstruction of an ice surface top-down view, etc. Such reconstructions can be used to evaluate detection quality and to automatically acquire knowledge of particular stadium drawings, ads, logo, etc., which can be used for custom orientation in 3D space particular to that stadium, based on the now known locations of these objects in the 3D world and on the ice/board surfaces.

The rich features detection of the machine-vision system 108 can provide numerous visual clues to identify errors in feature detection/prediction, automatically correct the erroneous feature, and then re-train the machine-learning components with this additional data to improve detection quality and reliability.

Time consistency can be a powerful feature employed by the machine-vision system 108. In an actual-sporting event objects follow limitations of the physical world including having constraints on speed of movement, motion, pose changes, mutual and spatial relationships, etc. Whereas in a virtual-sporting event, without careful consideration, objects may not follow limitations of the physical world and may appear to move with unrealistic speed, move in unrealistic ways, contort through physically impossible pose changes, disregard spatial relationships, etc. The machine-vision system 108 can use correlation between time data 122 and 132 can in frame-by-frame comparison of detected features to expose detection algorithms errors and inconsistencies.

Figure 7:
FIG. 7 illustrates an error identified using generated bounding box and time features in an example hockey scene, in accordance with extending knowledge data in machine vision as described herein.

FIG. 7 illustrates an example hockey scene 700, in accordance with extending knowledge data in machine vision as described herein. Scene 700, a screen grab from machine-vision system 108 in operation, shows results from using generated bounding box and time features including an example of an identified error 702.

A player mask, such as described regarding FIG. 3, and a related bounding box such as described regarding FIG. 4, in real-life datasets associated with videos of actual-sporting events should adhere to physical laws and not change arbitrarily frame over frame, unless there has been a video edit.

Thus, either of those features changing drastically frame over frame and not resolving in a shortly subsequent frame is an indication of an issue that machine-vision system 108 can detect and in many cases correct.

In scene 700 the bounding box 704 generated around the mask of the representation of the player 706 is overly extended to include the glass stanchions 708 on the lower board. The machine-vision system 108 can detect and mark the anomaly, which can be used to mark and re-annotate this frame to be consistent with adjacent frames. The same approach can be applied to player features and environment features to extend and improve the datasets.

Figure 8:
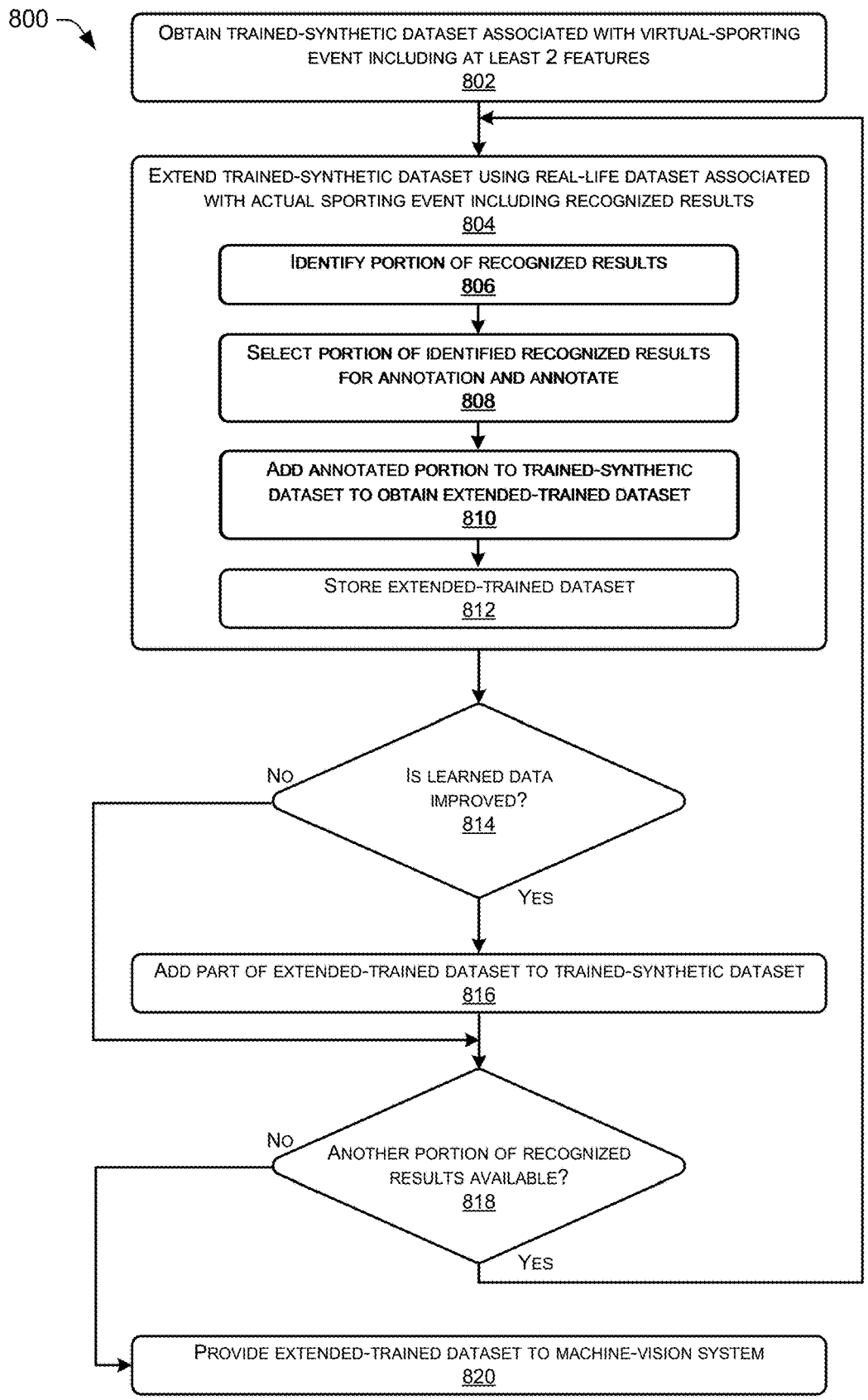
FIG. 8 illustrates a flow diagram of an example method of training a machine-vision system, in accordance with extending knowledge data in machine vision as described herein.

FIG. 8 illustrates a flow diagram 800 of an example method of training a machine-vision system, in accordance with extending knowledge data in machine vision as described herein.

At block 802, the machine-vision system 108 obtains a trained-synthetic dataset associated with a virtual-sporting event, such as a dataset from virtual-sporting event datastore 110. In various examples, features of the trained-synthetic dataset can be obtained from video-game image data 116 and include one or more of a tagged part of a representation of a player from player representation data 118 or player characteristics data 120, a silhouette of the representation of the player from player representation data 118 or player characteristics data 120, a center-heat map associated with the representation of the player, a bounding box associated with the representation of the player from player characteristic data 120.

Flow diagram 800 illustrates performing one or more iterations of extending the trained-synthetic dataset. At block 804, machine-vision system 108 extends the trained-synthetic dataset using a real-life dataset associated with an actual sporting event including recognized results. The extending can include a machine-learning component identifying a portion of the recognized results from the real-life dataset 806, the machine-learning component or other programming logic selecting the portion of the recognized results from the real-life dataset for annotation and the machine-learning component annotating the portion of the recognized results from the real-life dataset to generate an annotated portion 808, the machine-learning component adding the annotated portion to the trained-synthetic dataset to obtain an extended-trained dataset 810, and the machine-learning component storing the extended-trained dataset 812.

At block 814, the machine-learning component can determine whether learned data from the extended-trained dataset represents improved detection of the features compared to the trained-synthetic dataset. If not, the processing proceeds to block 818. At block 816, the machine-learning component can add part of the extended-trained dataset to the trained synthetic dataset. At block 818, the machine-learning component can determine whether another portion of recognized results is available. Based on improvement of detection of the features and availability of another portion of the recognized results, the machine-learning component can repeat the extending using a part of the extended-trained dataset as the trained-synthetic dataset in a next iteration beginning with block 804.

At block 820, the machine-learning component can provide the extended-trained dataset to the machine-vision system.

Figure 9:
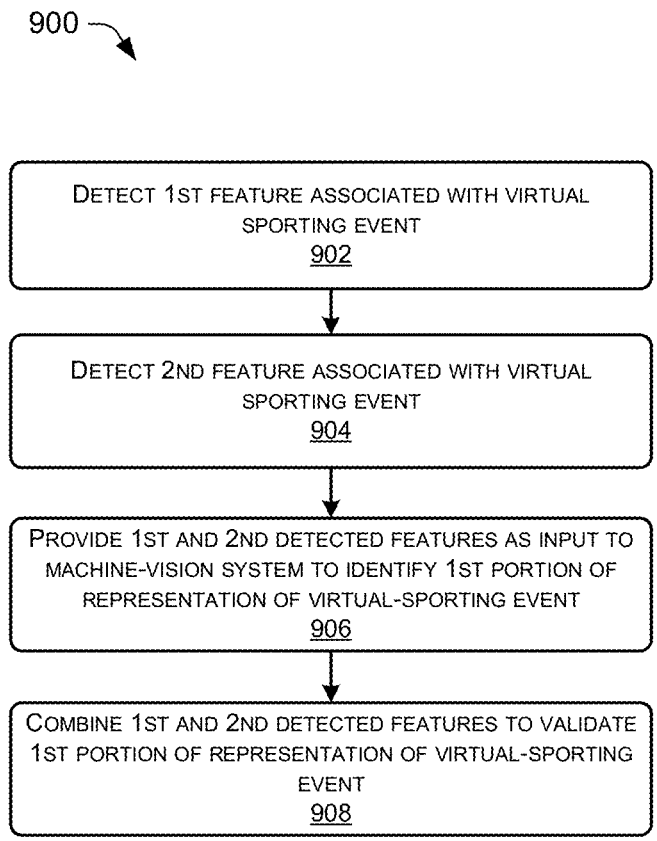
FIG. 9 illustrates a flow diagram of an example method of using a machine-vision system, in accordance with extending knowledge data in machine vision as described herein.

FIG. 9 illustrates a flow diagram of an example method 900 of using a machine-vision system, in accordance with extending knowledge data in machine vision as described herein.

At block 902, a machine-learning component of the machine-vision system 108 can detect a first feature associated with a virtual-sporting event as a first detected feature.

At block 904, a machine-learning component of the machine-vision system 108 can detect a second feature associated with the virtual-sporting event as a second detected feature. In various examples, the machine-learning component that detects the second feature can be a different machine-learning component, and/or a different type of machine-learning component from the machine-learning component that detected the first feature.

At block 906, a machine-learning component and/or programming logic can provide the first detected feature and the second detected feature as input to machine-vision system 108 to identify at least a first portion of a representation of the virtual-sporting event.

At block 908, a machine-learning component and/or programming logic can combine the first detected feature and the second detected feature to validate the first portion of the representation of the virtual-sporting event.

Figure 10:
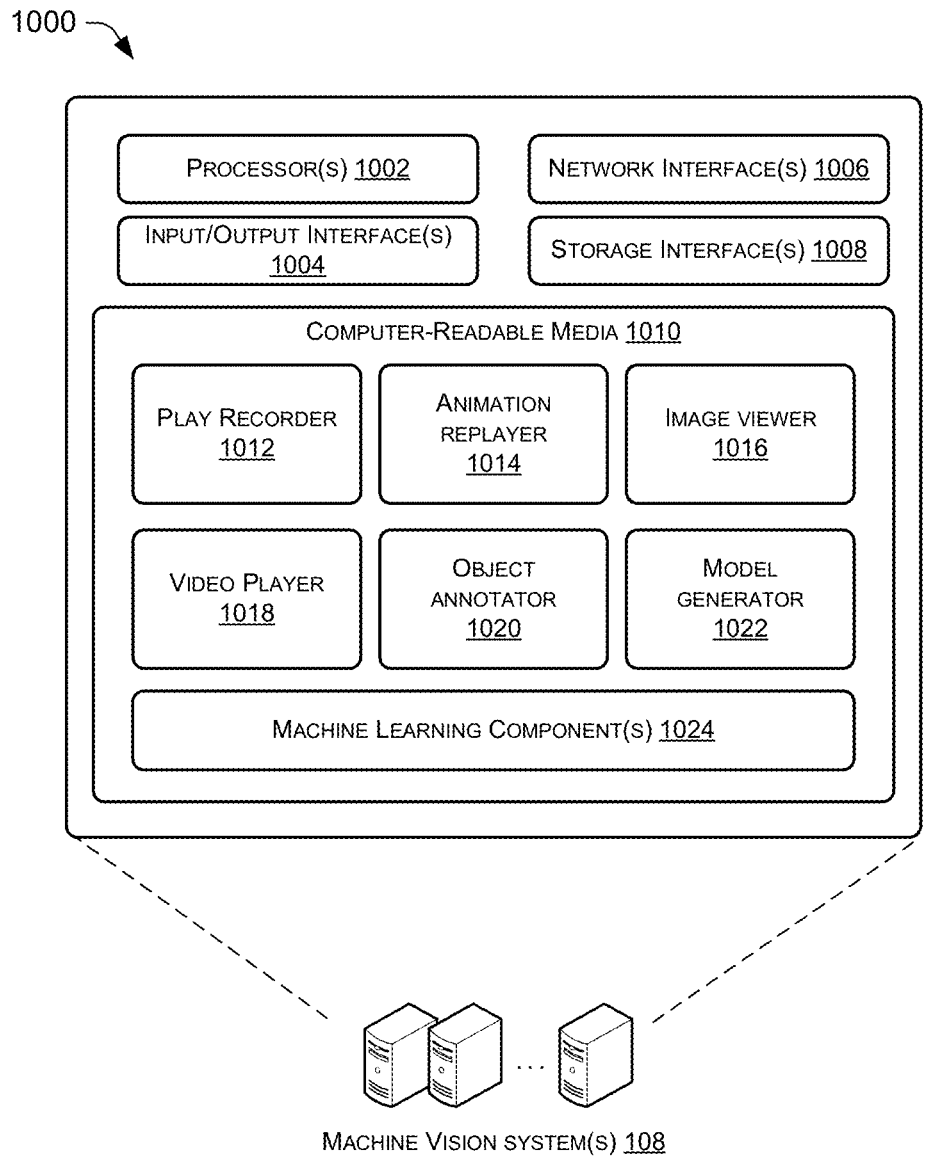
FIG. 10 illustrates a block diagram of an example machine-vision system that can extend knowledge data in machine vision, in accordance with examples described herein.

FIG. 10 illustrates a block diagram of example computing device(s) 1000 of machine-vision system(s) 108 that can extend knowledge data in machine vision, in accordance with examples described herein.

The computing device(s) 1000 can include one or more processor(s) 1002, one or more input/output (I/O) interface(s) 1004, one or more network interface(s) 1006, one or more storage interface(s) 1008, and computer-readable media 1010.

In various examples, the processors(s) 1002 can include one or more of a central processing unit (CPU), a graphics processing unit (GPU), a microprocessor, a digital signal processor, and/or other processing units or components. Alternatively, or in addition, the processing described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each processor(s) 1002 may possess its own local memory, which also can store programs, program data, and/or one or more operating systems. Furthermore, the one or more processor(s) 1002 can include one or more cores.

The one or more input/output (I/O) interface(s) 1004 can enable the computing device(s) 1000 of machine-vision system(s) 108 to detect interaction with a video-game developer 114 and/or other computing system(s). The I/O interface(s) 1004 can include a combination of hardware, software, and/or firmware and can include software drivers for enabling the operation of any variety of I/O device(s) integrated on the computing device(s) 1000 of machine-vision system(s) 108 or with which computing device(s) 1000 of machine-vision system(s) 108 interact, such as displays, microphones, speakers, cameras, switches, and any other variety of sensors, or the like. In various examples, the I/O devices of the computing device(s) 1000 of machine-vision system(s) 108 can include audio, video, and/or other input functionality.

The network interface(s) 1006 can enable the computing device(s) 1000 of machine-vision system(s) 108 to communicate via the one or more network(s). The network interface(s) 1006 can include a combination of hardware, software, and/or firmware and can include software drivers for enabling any variety of protocol-based communications, and any variety of wireline and/or wireless ports/antennas. For example, the network interface(s) 1006 can include one or more of a cellular radio, a wireless (e.g., IEEE 802.1x-based) interface, a Bluetooth® interface, and the like. In some examples, the network interface(s) 1006 can connect to the Internet. The network interface(s) 1006 can further enable the computing device(s) 1000 of machine-vision system(s) 108 to communicate over circuit-switch domains and/or packet-switch domains.

The storage interface(s) 1008 can enable the processor(s) 1002 to interface and exchange data with computer-readable medium 1010, as well as any storage device(s) external to the computing device(s) 1000 of machine-vision system(s) 108, such as if virtual-sporting event datastore 110 and/or actual-sporting event datastore 112 are implemented in separate the computing device(s) of machine-vision system(s) 108. The storage interface(s) 1008 can further enable access to removable media.

The computer-readable media 1010 may include volatile and/or nonvolatile memory, removable and non-removable media implemented in any method or technology for storage of information, such as computer-readable instructions, data structures, program functions, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1010 may be implemented as computer-readable storage media (CRSM), which may be any available physical media accessible by the processor(s) 1002 to execute instructions stored on the memory 1010. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information, and which can be accessed by the processor(s) 1002. The computer-readable media 1010 may have an operating system (OS) and/or a variety of suitable applications stored thereon. The OS, when executed by the processor(s) 1002 may enable management of hardware and/or software resources of the computing device(s) 1000 of machine-vision system(s) 108.

Several functional blocks having instruction, data stores, such as virtual-sporting event datastore 110 and/or actual-sporting event datastore 112, and so forth can be stored within the computer-readable media 1010 and configured to execute on the processor(s) 1002. The computer readable media 1010 can have stored thereon a play recorder 1012, an animation replayer 1014, an image viewer 1016, a video player 1018, an object annotator 1020, a model generator 1022, and any number and/or type of machine-learning component(s) 1024. It will be appreciated that each of the blocks 1012, 1014, 1016, 1018, 1020, 1022, and 1024 can have instructions stored thereon that when executed by the processor(s) 1002 enable various functions pertaining to the operations of the computing device(s) 1000 of machine-vision system(s) 108. It should further be noted that one or more of the functions 1012, 1014, 1016, 1018, 1020, 1022, and 1024 operate separately or in conjunction with each other.

The instructions stored in play recorder 1012, when executed by processor(s) 1002, can configure computing device(s) 1000 of machine-vision system(s) 108 to record video-game play, such as for later replay and/or analysis. The computing device(s) 1000 of machine-vision system(s) 108 can be configured to record one or more video-game developer's play of a video game for the purposes of generating synthetic-training data. This video-game play may be recorded and then replayed to identify features and objects of interest. The recording may be stored in memory, storage, or any suitable location.

The instructions stored in animation replayer 1014, when executed by processor(s) 1002, can configure computing device(s) 1000 of machine-vision system(s) 108 to replay and annotate recorded animation. A video-game developer can interact with computing device(s) 1000 of machine-vision system(s) 108 to review animation that he or she recorded and provide an indication of anomalies during the game play and/or for events that transpire within that recording of the animation. Training data can be generated from this replay and annotation process, which in turn can then be used to build predictive models that can be deployed in a video game for real-time predictions of object locations, orientations, and/or features.

The instructions stored in image viewer 1016, when executed by processor(s) 1002, can configure computing device(s) 1000 of machine-vision system(s) 108 to display images from a real-life dataset associated with an actual sporting event. In some examples, a video-game developer can interact with computing device(s) 1000 of machine-vision system(s) 108 to review the images and provide an indication of objects and/or associated features represented in that image. Training data can be generated from this review and annotation process, which in turn can then be used to build predictive models that can be deployed in a video game for real-time predictions of object locations, orientations, and/or features.

The instructions stored in video player 1018, when executed by processor(s) 1002, can configure computing device(s) 1000 of machine-vision system(s) 108 to replay and annotate video from a real-life dataset associated with an actual sporting event. In some examples, a video-game developer can interact with computing device(s) 1000 of machine-vision system(s) 108 to review the video and provide an indication of objects and/or associated features represented in frames of that video. Training data can be generated from this review and annotation process, which in turn can then be used to build predictive models that can be deployed in a video game for real-time predictions of object locations, orientations, and/or features.

The instructions stored in object annotator 1020, when executed by processor(s) 1002, can configure computing device(s) 1000 of machine-vision system(s) 108 to receive information about detected, identified, and/or generated objects and their associated features and to generate training data therefrom. This training data can include one or more parameter values associated with an object and/or feature, e.g., a speed of movement of one or more objects, a pose, etc. of one or more objects.

In some cases, the initial video-game play that is recorded may incorporate a preliminary predictive model. When the recorded play is replayed and annotated, a video-game developer can indicate whether the preliminary predictive model made a correct determination or an error in predicting object location, orientation, and/or features. In this way, the machine-vision system(s) 108 can learn from anomalies and identify errors to be avoided in training.

The instructions stored in model generator 1022, when executed by processor(s) 1002, can configure computing device(s) 1000 of machine-vision system(s) 108 to generate predictive models. In some examples, the predictive models can be generated by the computing device(s) 1000 of machine-vision system(s) 108. In other example embodiments, other systems, such as dedicated machine learning and/or heuristics systems can provide the modeling services. The predictive models may be any suitable type of predictive model, such as any variety of machine learning model corresponding to the variety of machine-learning components described herein, e.g., a logistic regression model, a neural network model, etc.

The instructions stored in machine-learning component(s) 1024, when executed by processor(s) 1002, can configure computing device(s) 1000 of machine-vision system(s) 108 to use data structures and logic to process image and/or video data from virtual-sporting events and/or actual-sporting events and can include a variety of types such as semantic segmentation, classification networks, Multilayer Perceptrons (MLP), deep neural networks (DNN), convolutional neural networks (CNN), Long Short-Term Memory (LSTM) and/or other types of recurrent neural networks (RNN), recurrent and convolutional neural networks (R-CNN) and/or other types of hybrid neural networks. A machine-learning component can operate on variety of features within one or more sematic segmentation neural network types. In examples with a single sematic segmentation neural network type, a machine-learning component can operate on variety of features by using different network architectures (such as Hourglass, UNet, SegNet, SpineNet, etc.) and/or by varying a number of features per neural network type. For example, each neural network can be used to detect one feature type, such as one for faceoffs, one for arena lines, one for hockey net corners, one for stadium borders, etc. or any combination of features. Since each neural network has limited internal learning capabilities and/or resources, a machine-learning component as described herein can increase precision per requested feature(s). The machine-vision system described herein can use many, e.g., dozens to hundreds, of separate simple augmented networks to leverage multi-processor architecture and parallelization of processing. In various examples, simple augmented networks can include one-feature, two-feature, three-feature, etc. networks. Machine-learning components can also include light-weight models such as decision trees, random forest, Bayesian networks, or any suitable predictive models.

The illustrated aspects of the claimed subject matter can be practiced in distributed computing environments where certain tasks are performed by remote processing devices that are linked through a communications network. In a distributed computing environment, program functions can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of systems, methods, apparatuses, and/or computer program products according to examples of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams need not necessarily be performed in the order presented or need not necessarily be performed at all, according to some examples of the disclosure.

Computer-executable program instructions can be loaded onto a general purpose computer, a special-purpose computer, a processor, or other programmable data processing apparatus to produce a particular machine, such that the instructions that execute on the computer, processor, or other programmable data processing apparatus implement one or more functions specified in the flowchart block or blocks. These computer-program instructions can also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. Examples of the disclosure provide for a computer program product, comprising a computer usable medium having a computer-readable program code or program instructions embodied therein, the computer-readable program code adapted to be executed to implement one or more functions specified in the flow diagram block or blocks. The computer-program instructions can also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database can be transmitted to a centralized database capable of receiving data, information, or data records from more than one database or other data storage devices. In some embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific examples disclosed and that modifications and other embodiments are intended to be included within the scope of the appended claims. Although specific terms are employed herein, they are used in a generic and descriptive sense only and not for purposes of limitation unless specifically defined herein.

What is claimed is:

1. A method of training a machine-vision system, the method of training comprising:
    obtaining a trained-synthetic dataset associated with a virtual-sporting event, features of the trained-synthetic dataset including at least two of:
        a tagged part of a representation of a player;
        a silhouette of the representation of the player;
        a center-heat map associated with the representation of the player; and
        a bounding box associated with the representation of the player;
    performing one or more iterations of extending the trained-synthetic dataset using a real-life dataset associated with an actual sporting event including recognized results, the extending including:
        identifying a portion of the recognized results from the real-life dataset;
        selecting the portion of the recognized results from the real-life dataset for annotation;
        annotating the portion of the recognized results from the real-life dataset to generate an annotated portion;
        adding the annotated portion to the trained-synthetic dataset to obtain an extended-trained dataset;
        storing the extended-trained dataset;
    determining whether learned data from the extended-trained dataset represents improved detection of the features compared to the trained-synthetic dataset;
    based on improvement of detection of the features and availability of another portion of the recognized results, repeating the extending using a part of the extended-trained dataset as the trained-synthetic dataset in a next iteration;
    providing the extended-trained dataset to the machine-vision system,
    identifying an error in the learned data according to a relationship between two or more features;
    wherein:
        the features of the trained-synthetic dataset include the center-heat map associated with the representation of the player and the bounding box associated with the representation of the player; and
        identification of the error includes identifying that the center-heat map associated with the representation of the player is outside of the bounding box associated with the representation of the player; and
    selecting the part of the extended-trained dataset by:
        sorting the extended-trained dataset according to a number of errors in the learned data;
        selecting a middle portion of the extended-trained dataset according to the sort; and
        providing the middle portion of the extended-trained dataset as the trained-synthetic dataset in the next iteration.

2. The method of claim 1, wherein the features of the trained-synthetic dataset further include a time feature.

3. The method of claim 1, further comprising identifying whether context of a first feature corresponds to context of a second feature.

4. The method of claim 1, wherein:
    a first machine-learning component detects a first feature;
    a second machine-learning component detects a second feature; and
    the first machine-learning component and the second machine-learning component are different types of machine-learning components.

5. The method of claim 4, wherein as different types of machine-learning components associated with different feature types increase, reliability of the machine-vision system improves.

6. The method of claim 1, wherein at least part of at least one of the trained-synthetic dataset or the real-life dataset associated with the actual sporting event includes differential image data.

7. The method of claim 1, wherein the real-life dataset associated with the actual sporting event includes video data.

8. The method of claim 1, wherein:
    the features of the trained-synthetic dataset include the tagged part of a representation of a player; and
    the tagged part includes at least one of a head of the representation of the player, feet of the representation of the player, or a hockey stick associated with the representation of the player.

9. A system comprising:
    one or more processors; and one or more computer-readable media storing computer-executable instructions that, when executed by the one or more processors, configure a machine-vision system to perform operations comprising:
        obtaining a trained-synthetic dataset associated with a virtual-sporting event, features of the trained-synthetic dataset including at least two of:
            a tagged part of a representation of a player;
            a silhouette of the representation of the player;
            a center-heat map associated with the representation of the player; and
            a bounding box associated with the representation of the player;
        performing one or more iterations of extending the trained-synthetic dataset using a real-life dataset associated with an actual sporting event including recognized results, the extending including:
            identifying a portion of the recognized results from the real-life dataset;
            selecting the portion of the recognized results from the real-life dataset for annotation;

annotating the portion of the recognized results from the real-life dataset to generate an annotated portion;

adding the annotated portion to the trained-synthetic dataset to obtain an extended-trained dataset;

storing the extended-trained dataset;

determining whether learned data from the extended-trained dataset represents improved detection of the features compared to the trained-synthetic dataset;

based on improvement of detection of the features and availability of another portion of the recognized results, repeating the extending using a part of the extended-trained dataset as the trained-synthetic dataset in a next iteration; and providing the extended-trained dataset to the machine-vision system;

identifying an error in the learned data according to a relationship between two or more features;

wherein:
the features of the trained-synthetic dataset include the center-heat map associated with the representation of the player and the bounding box associated with the representation of the player; and identification of the error includes identifying that the center-heat map associated with the representation of the player is outside of the bounding box associated with the representation of the player; and selecting the part of the extended- trained dataset by:

sorting the extended-trained dataset according to a number of errors in the learned data;

selecting a middle portion of the extended-trained dataset according to the sort; and providing the middle portion of the extended-trained dataset as the trained-synthetic dataset in the next iteration.

10. The system of claim 9, wherein the features of the trained-synthetic dataset further include a time feature.

11. The system of claim 10, wherein a first machine-learning component detects a first feature and a second machine-learning component detects a second feature.

12. The system of claim 9, wherein:
the features of the trained-synthetic dataset include the tagged part of a representation of a player; and the tagged part includes at least one of a head of the representation of the player, feet of the representation of the player, or a hockey stick associated with the representation of the player.

* * * * *